US011878286B2

(12) United States Patent
Park et al.

(10) Patent No.: US 11,878,286 B2
(45) Date of Patent: Jan. 23, 2024

(54) CATALYST FOR HYDROGENATION REACTION AND PREPARATION METHOD FOR SAME

(71) Applicant: HANWHA SOLUTIONS CORPORATION, Seoul (KR)

(72) Inventors: Woo Jin Park, Daejeon (KR); Yong Hee Lee, Daejeon (KR); Bong Sik Jeon, Daejeon (KR); Eui Geun Jung, Daejeon (KR); Wan Jae Myeong, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 195 days.

(21) Appl. No.: 17/299,311

(22) PCT Filed: Oct. 28, 2019

(86) PCT No.: PCT/KR2019/014262
§ 371 (c)(1),
(2) Date: Jun. 3, 2021

(87) PCT Pub. No.: WO2020/141705
PCT Pub. Date: Jul. 9, 2020

(65) Prior Publication Data
US 2022/0023842 A1 Jan. 27, 2022

(30) Foreign Application Priority Data
Dec. 31, 2018 (KR) .................. 10-2018-0173951

(51) Int. Cl.
B01J 23/75 (2006.01)
B01J 23/755 (2006.01)
(Continued)

(52) U.S. Cl.
CPC ............. B01J 23/755 (2013.01); B01J 21/08 (2013.01); B01J 35/026 (2013.01);
(Continued)

(58) Field of Classification Search
CPC . B01J 21/08; B01J 23/002; B01J 23/72; B01J 23/755; B01J 27/02; B01J 27/043;
(Continued)

(56) References Cited

U.S. PATENT DOCUMENTS 3,743,662 A 7/1973 Eurlings et al.
4,263,225 A 4/1981 Carter
(Continued)

FOREIGN PATENT DOCUMENTS

DE 03049414 9/1980
EP 3733288 A1 11/2020
(Continued)

OTHER PUBLICATIONS

Wolf, M. et al., 2016, Catalysis Today, 275, 135-140. (Year: 2016).*
(Continued)

Primary Examiner — Brian A McCaig
(74) Attorney, Agent, or Firm — Harvest IP Law, LLP

(57) ABSTRACT

The present invention relates to a catalyst for a hydrocarbon resin hydrogenation reaction and a preparation method for the same, wherein the catalyst is a nickel powder catalyst including nickel (Ni), copper (Cu), and sulfur (S), and more particularly, a nickel-based catalyst for a hydrogenation reaction, which is added to a hydrogenation reaction in order to improve the color of the hydrocarbon resin. According to an embodiment of the present invention, provided is a catalyst for a hydrogenation reaction, includes 40-80 parts by weight of nickel, 0.01-5 parts by weight of copper, 1-10 parts by weight of sulfur, and 10-60 parts by weight of a silica support based on 100 parts by weight of the entire
(Continued)

dried catalyst including a support. Therefore, the catalyst can improve the quality of hydrocarbon resin. Furthermore, the catalyst can provide colorless, odorless, and transparent water-white hydrocarbon resin with improved thermal stability by removing unsaturated bonds in the hydrocarbon resin.

21 Claims, 1 Drawing Sheet

(51) Int. Cl.
    *B01J 21/08*     (2006.01)
    *B01J 35/02*     (2006.01)
    *B01J 35/10*     (2006.01)
    *B01J 37/00*     (2006.01)
    *B01J 37/03*     (2006.01)
    *B01J 37/04*     (2006.01)
    *B01J 37/06*     (2006.01)
    *B01J 37/08*     (2006.01)
    *B01J 37/18*     (2006.01)
    *C08F 8/04*     (2006.01)
    *C08F 32/08*     (2006.01)

(52) U.S. Cl.
    CPC ....... *B01J 35/1009* (2013.01); *B01J 35/1014* (2013.01); *B01J 35/1019* (2013.01); *B01J 35/1057* (2013.01); *B01J 35/1061* (2013.01); *B01J 37/009* (2013.01); *B01J 37/035* (2013.01); *B01J 37/04* (2013.01); *B01J 37/06* (2013.01); *B01J 37/08* (2013.01); *B01J 37/18* (2013.01); *C08F 8/04* (2013.01); *C08F 32/08* (2013.01)

(58) Field of Classification Search
    CPC ........ B01J 33/00; B01J 35/006; B01J 35/023; B01J 35/1019; B01J 35/1038; B01J 35/1061; B01J 37/088; B01J 37/035; B01J 37/14; B01J 37/18; B01J 2523/00; C10G 29/16; C10G 45/06; C10G 2300/1037; C10G 2300/703; C10G 2300/705; C08F 8/04

See application file for complete search history.

(56) References Cited

U.S. PATENT DOCUMENTS

| | | | |
|---|---|---|---|
| 4,956,328 A | | 9/1990 | Frohning et al. |
| 5,482,616 A | * | 1/1996 | Brahma .................... C07C 5/10 |
| | | | 208/143 |
| 6,281,163 B1 | * | 8/2001 | Van Dijk ............... B01J 23/755 |
| | | | 554/146 |
| 2007/0010232 A1 | | 5/2007 | Reesink et al. |
| 2007/0102324 A1 | | 7/2007 | Reesink |
| 2014/0256972 A1 | * | 9/2014 | Bouwman ............... C11C 3/123 |
| | | | 502/259 |
| 2021/0002403 A1 | * | 1/2021 | Jeon ......................... B01J 37/06 |

FOREIGN PATENT DOCUMENTS

| | | |
|---|---|---|
| EP | 3733820 A1 | 11/2020 |
| JP | 1967006251 B | 3/1967 |
| JP | 026251 A | 1/1990 |
| JP | 2002275212 | 9/2002 |
| JP | 2011072933 A | 4/2011 |
| JP | 2012082432 A | 4/2012 |
| JP | 4958545 B2 | 4/2015 |
| KR | 1020050072109 A | 7/2005 |
| KR | 1020090064455 A | 6/2009 |
| KR | 1020160083522 A | 7/2016 |
| KR | 1020180124924 A | 11/2018 |
| KR | 1020190081127 A | 7/2019 |
| KR | 1020190081905 A | 7/2019 |
| RU | 2675361 C1 | 12/2018 |
| TW | 201819043 | 6/2018 |
| WO | 2019132407 A1 | 7/2019 |

OTHER PUBLICATIONS

Russ.Chem.Bull.,International Edition, vol. 65, No. 12, pp. 2841-2844.
International Search Report dated Mar. 2, 2020.

* cited by examiner

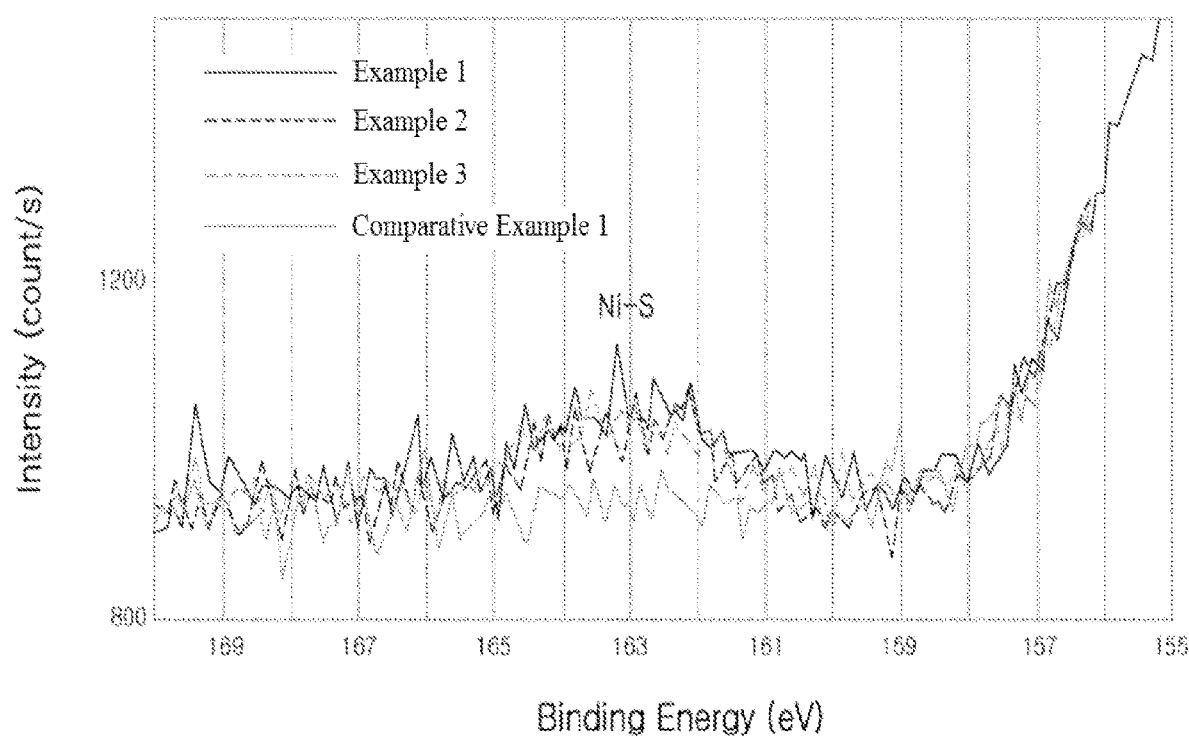

CATALYST FOR HYDROGENATION REACTION AND PREPARATION METHOD FOR SAME

CROSS-REFERENCE TO RELATED APPLICATIONS

This application is a National Stage of International Application No. PCT/KR2019/014262 filed Oct. 28, 2019, claiming priority based on Korean Patent Application No. 10-2018-0173951 filed Dec. 31, 2018.

TECHNICAL FIELD

The present invention relates to a catalyst for a hydrocarbon resin hydrogenation reaction and a preparation method for the same, wherein the catalyst is a nickel powder catalyst including nickel (Ni), copper (Cu), and sulfur (S), and more particularly, a nickel-based catalyst for a hydrogenation reaction, which is added to a hydrogenation reaction in order to improve the color of hydrocarbon resin.

BACKGROUND ART

Lower olefins (i.e., ethylene, propylene, butylene, and butadiene) and aromatic compounds (i.e., benzene, toluene, and xylene) are basic intermediates that are widely used in the petrochemical and chemical industries. Thermal cracking or steam pyrolysis is the main type of process that is typically performed for forming these materials in the presence of steam and in the absence of oxygen. The feedstock may include, in addition to naphtha, petroleum gases and distillates such as kerosene and gas oil. At this time, naphtha or the like may be pyrolyzed to produce materials such as C4 fraction including ethylene, propylene, butane, and butadiene.

C5 fraction including dicyclopentadiene (DCPD), cracked gasoline (including benzene, toluene, and xylene), cracked kerosene (C9 or more fractions), cracked heavy oil (ethylene bottom oil), and hydrogen gas. Hydrocarbon resins may be prepared by polymerizing fractions and the like.

However, since hydrocarbon resins include unsaturated bonds in part, the quality thereof may deteriorate. At this time, if a hydrogenation process of adding hydrogen is performed, unsaturated bonds are removed so that the color becomes brighter and the odor peculiar to hydrocarbon resins decreases, resulting in an improvement in quality. In addition, hydrocarbon resins, from which unsaturated bonds are removed, are called water-white resins because they are colorless and transparent, and are distributed as high-quality resins with excellent heat and ultraviolet (UV) stability.

For the hydrocarbon resins in which C5 fractions, C9 fractions, DCPD, and the like are copolymerized, the compatibility with styrene-based polymers such as ethylene-vinyl acetate (EVA), styrene-isoprene-styrene (SIS), or styrene-butadiene-styrene (SBS) is adjusted according to an aromatic content. Therefore, in order to prepare water-white resins while controlling the aromatic content in the hydrocarbon resin hydrogenation reaction, it is necessary to selectively hydrogenate the olefin part of the resin.

In particular, it is known that a noble metal catalyst such as palladium (PD) or platinum (PT) is used in order to selectively hydrogenate olefin in aromatic unsaturated hydrocarbons. The palladium catalyst is mainly used as a selective hydrogenation catalyst due to its excellent activity and selectivity compared to other metal catalysts. However, the palladium catalyst has a problem that, when hydrogenation is performed in a liquid phase, palladium is lost and Pd complex compounds are formed. On the other hand, when a Ni-based catalyst is used, an aromatic is hydrogenated together. Thus, it is difficult to use the Ni-based catalyst for the selective hydrogenation reaction of the aromatic compound.

Germany Patent Publication No. 03049414 discloses a catalyst for a hydrogenation reaction, which has a degree of reduction of 40-77 when a hydrogenation reaction of an unsaturated organic compound such as cyclooctadiene is performed using a catalyst including an inorganic support such as nickel and silica gel. However, the reactants and the composition of the catalyst are limited to the above.

U.S. Pat. No. 4,956,328 discloses that a hydrogenation reaction of nitrobenzene is performed using a catalyst in which nickel, zirconium, and aluminum are supported on a diatomite support including $SiO_2$. However, there is a limitation in that the reactants and the composition of the catalysts are limited to the above.

Japanese Patent Registration No. 4958545 discloses a catalyst that contacts a nickel oxide catalyst supported on alumina with a sulfur-containing agent. In particular, Japanese Patent No. 4958545 discloses that a catalyst in which nickel-sulfur is supported on a support is used when a hydrogenation reaction of aromatic or hydrocarbons is performed. However, this is also limited to the above.

Finally, as the non-patent publication, RUSS. CHEM. BULL., INTERNATIONAL EDITION, VOL. 65, NO. 12, PP. 2841-2844 discloses that a selective hydrogenation reaction of 1,3-pentadiene is performed using a nickel-sulfur/silica catalyst. This aims to improve the hydrogenation selectivity of 1,3-pentadiene by adding sulfur.

Therefore, there is an urgent need to develop a catalyst that overcomes the above-described problems, facilitates the selection of a support suitable for a reaction and optimization of a hydrocarbon resin hydrogenation reaction, and has excellent activity as a hydrogenation catalyst.

(Patent Literature 1) German Patent Publication No. 03049414 (Sep. 17, 1981)

(Patent Literature 2) U.S. Pat. No. 4,956,328 (Apr. 11, 1990)

(Patent Literature 3) Japanese Patent Registration No. 4958545 (Mar. 30, 2012)

(Non-Patent Literature 4) RUSS. CHEM. BULL., INTERNATIONAL EDITION, VOL. 65, NO. 12, PP. 2841-2844 (2016 November)

DESCRIPTION OF EMBODIMENTS

Technical Problem

An object of the present invention aims to solve the above-described problems.

Another object of the present invention is to provide a nickel-based powder catalyst for a hydrogenation reaction so as to improve the quality of hydrocarbon resins.

The nickel-based powder catalyst for the hydrogenation reaction according to the present invention provides a hydrogenation catalyst having a high degree of reduction and a high hydrogenation activity of hydrocarbon resins.

Another object of the present invention is to provide a colorless, odorless, and transparent water-white hydrocarbon resin with improved thermal stability by removing unsaturated bonds in a hydrocarbon resin prepared by polymerizing fractions such as C5, C9, or DCPD as a main ingredient using a catalyst having a high degree of nickel (Ni) reduction of 90% or more.

In particular, another object of the present invention is to provide a catalyst for a hydrogenation reaction, in which the hydrogenation reaction has a higher selectivity to olefin relative to aromatic among unsaturated bonds.

In addition, the hydrocarbon resin hydrogenated by the catalyst prepared according to the present invention has an American Public Health Association (APHA) value of 30 or less.

Solution to Problem

In order to achieve the above-described objects of the present invention and achieve the characteristic effects of the present invention described below, the characteristic construction of the present invention is as follows.

According to an embodiment of the present invention, a catalyst for a hydrogenation reaction includes 40-80 parts by weight of nickel, 0.01-5 parts by weight of copper, 1-10 parts by weight of sulfur, and 10-60 parts by weight of a silica support based on 100 parts by weight of the entire dried catalyst including a support. In this case, the catalyst for the hydrogenation reaction has a degree of nickel reduction of 90% or more.

According to another embodiment of the present invention, an average size of crystals of the nickel may be 3-10 nm. In the catalyst particle size distribution, an average particle size may be 3-10 μm, and a proportion of particles having a size of 1 μm or less may be 0-10 vol %. In addition, the catalyst may have a specific surface area of 150-300 $m^2/g$.

According to an embodiment of the present invention, the silica support may be a porous support having a specific surface area of 200-400 $m^2/g$ and a pore size of 10-30 nm.

According to an embodiment of the present invention, the degree of nickel reduction may be measured by hydrogen-temperature program reduction ($H_2$-TPR). In this case, the catalyst has a hydrogen adsorption amount per sample weight in a range of 0.01-0.3 (mmol-$H_2$/g-catalyst) through an $H_2$-chemisorption measurement.

According to an embodiment of the present invention, the catalyst may have an electron absorption peak by Ni—S bond in a range of 159-166 eV (binding energy or bonding energy) through an X-ray photoelectron spectroscopy (XPS) analysis.

According to an embodiment of the present invention, the nickel may form a precipitate with the copper and the sulfur, may be supported on the support, preferably the silica support, and may be deposited and precipitated.

In particular, the hydrogenation reaction may have a higher selectivity to olefin relative to aromatic.

In addition, a reactant of the hydrogenation reaction may be a hydrocarbon resin, and preferably a hydrocarbon resin including dicyclopentadiene (DCPD). Furthermore, the reactant of the hydrogenation reaction may be a hydrocarbon resin including C9 fraction. The reactant of the hydrogenation reaction may be a hydrocarbon resin including C5 fraction. In this case, when the hydrogenation reaction is completed, the hydrocarbon resin may have an APHA value of 30 or less.

According to an embodiment of the present invention, the catalyst for the hydrogenation reaction may be at least one selected from a powder form, a particle form, and a granular form. Preferably, the catalyst for the hydrogenation reaction may be the powder form.

According to an embodiment of the present invention, a method for preparing a catalyst for a hydrogenation reaction may include the steps of: (a) preparing a first solution by dissolving, in a solvent, 40-80 parts by weight of nickel, 0.01-5 parts by weight of copper, and 10-60 parts by weight of a silica support based on 100 parts by weight of the entire dried catalyst including a support; (b) adding the first solution to a precipitation container, stirring the first solution, and heating the first solution to a temperature of 60-100° C.; (c) after the heating, preparing a second solution by adding a pH control agent and a sulfur precursor in a precipitation container, and preparing a precipitate by adding the second solution dropwise to the first solution; (d) washing and filtering the precipitate and drying the precipitate to prepare a dried product; and (e) reducing the dried product in a hydrogen atmosphere to prepare a reduced product.

In addition, the method may further include, after the step (d), sintering the prepared dried product in an air atmosphere. That is, the sintering may be selectively provided in the air atmosphere when necessary.

A temperature of the hydrogen atmosphere may be 200-500° C. A temperature of the air atmosphere may also be 200-500° C.

In addition, the method may further include passivating the reduced product with a nitrogen mixed gas including 0.1-20% oxygen. The method may further include passivating the reduced product by directly depositing the reduced product in an organic solvent. D40 Exxsol may be used as the organic solvent. Any organic solvent may be used as long as the organic solvent can block air.

According to an embodiment of the present invention, a pH in the step (c) of preparing the precipitate may be 7-9, and the drying in the step (d) may be performed at 100-200° C. for 5-24 hours.

According to an embodiment of the present invention, provided is a hydrogenation method for contacting a hydrocarbon resin with hydrogen in the presence of the catalyst for the hydrogenation reaction prepared by the method described above. In this case, the hydrocarbon resin may include dicyclopentadiene (DCPD).

In addition, according to an embodiment of the present invention, when the hydrocarbon resin contacts the hydrogen and the hydrogenation reaction is completed, the hydrocarbon resin may have an APHA value of 30 or less.

Advantageous Effects of Disclosure

A nickel-based catalyst for a hydrogenation reaction according to the present invention provides an effect of improving the quality of the hydrocarbon resin. In particular, there is an effect of providing a catalyst having a degree of reduction of 90% or more.

The catalyst according to the present invention provides an effect of improving the quality of the hydrocarbon resin. A colorless, odorless, and transparent water-white hydrocarbon resin with improved thermal stability may be provided by removing unsaturated bonds in a hydrocarbon resin.

There is an effect of providing a catalyst that has a higher selectivity to olefin relative to aromatic among the unsaturated bonds.

Furthermore, there is an effect that a hydrogenated hydrocarbon resin has an American Public Health Association (APHA) value of 30 or less.

The catalyst according to the present invention has an effect of easily optimizing the preparation of a hydrogenation catalyst, which has a particle size, size distribution, surface area, and pore structure suitable for the reaction and has a degree of Ni reduction of 90% or more, by supporting a catalyst composition on a support by a deposition-precipitation (DP) method.

BRIEF DESCRIPTION OF DRAWING

FIG. 1 shows an analysis result of an X-ray photoelectron spectroscopy (XPS) with respect to a catalyst according to an embodiment of the present invention.

BEST MODE

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, embodiments of the present invention will be described with reference to the accompanying drawings, so that those of ordinary skill in the art can easily carry out the present invention.

According to an embodiment of the present invention, a hydrogenation catalyst includes 40-80 parts by weight of nickel, 0.01-5 parts by weight of copper, 1-10 parts by weight of sulfur, and 10-60 parts by weight of a silica support based on 100 parts by weight of the entire dried catalyst including a support, and the catalyst has a degree of nickel reduction of 90% or more.

According to an embodiment of the present invention, a hydrogenation nickel-based catalyst for a hydrogenation reaction is provided for improving the quality of hydrocarbon resins prepared by polymerizing dicyclopentadiene (DCPD) as a main ingredient. The DCPD hydrocarbon resin has a yellow color, has a bad smell, and is easily oxidized due to the unsaturated bonds remaining after polymerization (unsaturated bonds of olefin and aromatic). In order to improve the quality of hydrocarbon resins, a nickel (Ni) catalyst, and preferably a nickel powder catalyst, may be used in high temperature high pressure conditions (e.g., 250° C. and 90 bar) to prepare a colorless and odorless water-white hydrocarbon resin with improved thermal stability, from which unsaturated bonds are removed when a hydrogenation reaction is performed.

In particular, according to an embodiment of the present invention, when a Ni powder catalyst including copper (Cu) and sulfur (S) is used in a DCPD hydrocarbon resin hydrogenation reaction, the selectivity to olefin relative to aromatic is high.

According to an embodiment of the present invention, the crystal of nickel has an average size of 3-10 nm. In addition, in the catalyst particle size distribution, the average particle size may be 3-10 μm, and the proportion of particles having a size of 1 μm or less may be 0-10 vol %. The catalyst has a specific surface area of 150-300 m$^2$/g. Since the hydrogenation catalyst having a degree of Ni reduction of 90% or more has such physical properties, the activity and catalyst lifetime may be improved and the efficiency improvement effect of the process of separating the product from the catalyst may be optimally provided.

According to an embodiment of the present invention, the hydrogenation catalyst may be prepared by being mixed in a solvent in a precursor form of nickel, copper, and sulfur. A precipitation may be used to deposit the hydrogenation catalyst in a solid support in which nickel, copper, and sulfur components are suspended in a solvent.

In this case, the support is preferably a silica support. The silica support is a porous support having a specific surface area of 200-400 m$^2$/g and a pore size of 10-30 nm. In this case, the activity of nickel, copper, and sulfur is excellent.

According to an embodiment of the present invention, as the catalyst, nickel forms a precipitate with copper and sulfur, is supported on the silica support, and is deposited and precipitated, and a degree of Ni reduction is 90% or more.

In addition, compared to the catalyst prepared by the coprecipitation method, when the catalyst is prepared by the DP method using silica having a uniform particle size distribution, the catalyst composition is supported on the support in which the particle size is adjusted, thereby facilitating the preparation of the catalyst having a particle size, size distribution, surface area, and pore structure suitable for the reaction.

The nickel catalyst has excellent catalytic activity in the hydrogenation reaction. However, if a high content of nickel is supported in the DP method in which the nickel catalyst is supported on the silica support and is deposited and precipitated, the crystal size of nickel increases and the dispersibility decreases, thus lowering the activity. In addition, when the content of nickel is low, the activity of the catalyst is lowered.

In spite of using the nickel catalyst, by adding copper (Cu) and sulfur (S), the hydrogenation catalyst according to an embodiment of the present invention has a high content of nickel and a high degree of dispersibility, thereby obtaining a high degree of Ni reduction with excellent catalytic activity. Even when the hydrogenation catalyst is supported by the DP method, a degree of Ni dispersibility is high and a crystal size is small, thereby providing excellent activity in the hydrogenation reaction.

According to an embodiment of the present invention, when nickel forms a precipitate with sulfur and is supported on the silica support, sulfur is 1-10 parts by weight. In the above range, the unsaturated bonds of the hydrocarbon resin is removed in the hydrogenation reaction, contributing to providing the colorless and odorless hydrocarbon resin with excellent thermal stability and contributing to improving the selectivity to olefin relative to aromatic among the unsaturated bonds.

In addition, when nickel forms a precipitate with copper and is supported on the silica support, copper is 0.01-5 parts by weight. In the above range, nickel reduction may be facilitated and a high degree of metal reduction may be obtained at a relatively low temperature.

According to an embodiment of the present invention, provided is a catalyst for a hydrogenation reaction, of which a degree of nickel reduction measured by a hydrogen-temperature program reduction (H$_2$-TPR) is 90% or more. The H$_2$-TPR evaluates the reduction capacity of catalyst particles. According to the above-described analysis method, the degree of nickel (Ni) reduction according to the present invention is 90% or more, but the degree of nickel (Ni) reduction of the well-known powdered nickel (Ni)-based catalyst for the hydrocarbon resin hydrogenation reaction does not exceed 90%. The reduction degree analysis using the above-described analysis method is as follows.

Degree of reduction=
① Area of base in catalyst TPR graph
② Area of base in TPR graph after removal of passivation layer
① Analysis of area of base in catalyst TPR graph
1) Amount of catalyst used
0.05 g
2) Catalyst pretreatment
He flows at a rate of 30 mL/min and the temperature is raised to 300° C. at a rate of 10° C./min.
$H_2$ flows at a rate of 30 mL/min and the temperature is maintained at 300° C. for 45 minutes.
He flows at a rate of 30 mL/min and cooling analysis is made at 30° C.
3) $H_2$-TPR analysis
Analysis gas: $H_2$/Ar mixed gas
Flow rate: 30 mL ($H_2$/Ar=1.5/28.5)
Temperature: The temperature is raised from 30° C. to 810° C. at a rate of 5° C.
② Analysis of area of base in TPR graph after removal of passivation layer
1) Amount of catalyst used
0.05 g
2) Catalyst pretreatment
He flows at a rate of 30 mL/min and the temperature is raised to 300° C. at a rate of 10° C./min.
$H_2$ flows at a rate of 30 mL/min and the temperature is maintained at 300° C. for 45 minutes.
He flows at a rate of 30 mL/min and the temperature is raised to 400° C. at a rate of 10° C./min.
$O_2$ flows at a rate of 30 mL/min and the temperature is maintained at 400° C. for 2 hours.
Cooling to 60° C.
3) $H_2$-TPR analysis
Analysis gas: $H_2$/Ar mixed gas
Flow rate: 30 mL ($H_2$/Ar=1.5/28.5)
Temperature: The temperature is raised from 60° C. to 810° C. at a rate of 5° C.

According to an embodiment of the present invention, a nickel-based catalyst including 40-80 parts by weight of nickel, 0.01-5 parts by weight of copper, 1-10 parts by weight of sulfur, and 10-60 parts by weight of a silica support based on 100 parts by weight of the entire dried catalyst including a support is used to provide a catalyst in the range of the above-described optimized combination and the silica support having a particle size, size distribution, surface area, and pore structure suitable for a reaction. The catalyst may provide a degree of nickel (Ni) reduction of 90% or more in the hydrogenation reaction. In particular, by supporting sulfur (S) together with nickel, the hydrogenation reaction provides a higher selectivity to olefin relative to aromatic. After the hydrogenation reaction on the olefin-based unsaturated hydrocarbons, the hydrocarbon resin including a part of the aromatic is also highly compatible with a base polymer such as ethylene vinyl acetate (EVA) or styrene-isoprene-styrene (SIS), compared to the hydrocarbon resin including no aromatic.

The reactant of the hydrogenation reaction according to an embodiment of the present invention may be a hydrocarbon resin including C5 or C9 fraction obtained from naphtha, DCPD fraction by-product, and combinations thereof, and may include cyclodiene and a benzene functional group. However, the present invention is not limited thereto.

In addition, the catalyst for the hydrogenation reaction according to the present invention has an APHA value of 30 or less after the hydrogenation reaction of the hydrocarbon resin is completed. When the color of the hydrocarbon resin is 30 or less, the hydrocarbon resin becomes a water-white resin in which the color and smell of the hydrocarbon resin almost disappear. At this time, the content of the remaining olefin (NMR % area) is less than 0.1%. Therefore, the use of the catalyst for the hydrogenation reaction according to the present invention may help to improve the selectivity to olefin relative to aromatic.

The catalyst according to the present invention may be in a powder form, a particle form, or a granular form. Preferably, the catalyst according to the present invention is in a powder form.

The catalyst according to the present invention has a hydrogen adsorption amount per catalyst weight in a range of 0.01-0.3 (mmol-$H_2$/g-catalyst) through an $H_2$-chemisorption analysis. The $H_2$-chemisorption was analyzed using Micromeritics's ASAP 2020. A sample used was 0.25 g and was heated at 90° C. for 30 minutes before analysis, and degassing was performed thereon at 200° C. for 4 hours. An analysis temperature was 50° C. and pretreatment was performed at 300° C. in an $H_2$ atmosphere.

The catalyst according to the present invention has an electron absorption peak by Ni—S bond in a range of 159-166 eV (binding energy or bonding energy) through an X-ray photoelectron spectroscopy (XPS) analysis.

The XPS is an apparatus capable of analyzing an oxidation state of atoms and the oxidation state has a different bonding energy value according to the type of the atom bonded. The binding energy of the atomic phase may be measured by measuring the kinetic energy of the photoelectron emitted when characteristic X-ray is incident on the surface of the sample. The XPS measured the bonding energy at room temperature in vacuum atmosphere by using Multilab 2000.

According to an embodiment of the present invention, provided is a method for preparing a catalyst for a hydrogenation reaction, including the steps: (a) preparing a first solution by dissolving, in a solvent, 40-80 parts by weight of nickel, 0.01-5 parts by weight of copper, and 10-60 parts by weight of a silica support based on 100 parts by weight of the entire dried catalyst including a support; (b) adding the first solution to a precipitation container, stirring the first solution, and heating the first solution to a temperature of 60-100° C.; (c) after the heating, preparing a second solution by adding a pH control agent and a sulfur precursor in a precipitation container, and preparing a precipitate by adding the second solution dropwise to the first solution; (d) washing and filtering the precipitate and drying the precipitate to prepare a dried product; and (e) reducing the dried product in a hydrogen atmosphere to prepare a reduced product. The catalyst prepared by the preparation method has a degree of nickel reduction of 90% or more.

In addition, after the step (d), the method may further include sintering the dried product in an air atmosphere. The sintering is not necessarily provided, and those of ordinary skill in the art can appropriately select the sintering when necessary. In this case, the temperature may be 200-500° C. The temperature of the hydrogen atmosphere may also be 200-500° C. Accordingly, the sintering and reduction effect may be provided.

Furthermore, the method may further include passivating the reduced product with a nitrogen mixed gas including 0.1-20% oxygen or passivating the reduced product by depositing the reduced product in a solution including an organic solvent and a hydrocarbon resin.

According to an embodiment of the present invention, a nickel feedstock precursor in the step (a) may include nickel and metal salts such as nitrate, acetate, sulfate, and chloride. Most preferably, a nickel sulfate precursor including sulfate is provided as the nickel supply source precursor.

In addition, a copper and sulfur feedstock precursor is used in a state of being bonded to metal salts such as nitrate, acetate, sulfate, chloride, or combinations thereof. Most preferably, sodium sulfide and copper sulfate is used as the copper and sulfur feedstock precursor. Furthermore, a precipitate such as sodium carbonate or sodium carbonate, and sodium hydrogen carbonate may be provided.

According to an embodiment of the present invention, a pH in the step (c) of preparing the precipitate is 7-9. The precipitation of the catalyst precursor may be performed in an environment of pH 7 or higher, and preferably pH 7-9, by addition of a base or electrochemical means. In this case, for the addition of the base, a basic compound may be added. A basic additive may include sodium carbonate, sodium hydroxide, sodium hydrogen carbonate, ammonia, or a hydrate thereof, but the present invention is not limited thereto. Preferably, the basic additive may include sodium carbonate or a hydrate thereof.

According to an embodiment of the present invention, the drying in the step (d) may be performed at 100-200° C. for 5-24 hours. In the above range, an effect of removing moisture included in the precipitate may be provided.

According to an embodiment of the present invention, the hydrogenation reaction may have a higher selectivity to olefin relative to aromatic.

According to an embodiment of the present invention, provided is a hydrogenation method which contacts a hydrocarbon resin with hydrogen in the presence of the catalyst for the hydrogenation reaction prepared by the above-described preparation method.

The hydrocarbon resin may be hydrogenated at a temperature of 100-400° C., and preferably 200-300° C., and at a pressure of 1-200 bar, and preferably 30-100 bar. The hydrogenation time may depend primarily on the temperature, the amount of catalyst, and the degree of hydrogenation.

The hydrogenation reaction may be performed in various reactors. Preferably, the hydrogenation reaction may be performed in a continuous stirred tank reactor (CSTR) or a loop reactor. In addition, optimal activity may be exhibited when the reduction temperature is 200-500° C., and preferably 350-450° C., as described above.

According to an embodiment of the present invention, the hydrocarbon resin, which is the reactant in the hydrogenation reaction, includes dicyclopentadiene (DCPD). In addition, a hydrocarbon resin including C5 fraction may be provided, and a hydrocarbon resin including C9 fraction may be provided.

Furthermore, when the hydrocarbon resin contacts hydrogen and the hydrogenation reaction is completed, the hydrocarbon resin has an APHA value of 30 or less. APHA color is also referred to as Hazen scale or platinum cobalt (Pt/Co) scale and is a color standard analysis method (ASTM D1209) named for the American Public Health Association. The color of the hydrogenated hydrocarbon resin is analyzed by APHA value. When the color of the hydrocarbon resin is 30 or less, the hydrocarbon resin becomes a water-white resin in which the color and smell of the hydrocarbon resin almost disappear. At this time, the content of the remaining olefin (NMR % area) is less than 0.1%.

Hereinafter, the structure and operation of the present invention will be described in more detail with reference to preferred examples of the present invention. However, these example are shown by way of illustration and should not be construed as limiting the present invention in any way.

Since contents not described herein can be sufficiently technically inferred by those of ordinary skill in the art, descriptions thereof will be omitted.

EXAMPLES

Example 1

40 g of a porous silica powder having a surface area of 300 m$^2$/g and a pore size of 28 nm, 491 g of nickel sulfate, 6 g of copper sulfate, and 2,000 mL of distilled water were added to a precipitation container, stirred, and heated to a temperature of 80° C. After the temperature reached 80° C., 1,500 mL of a solution including 262 g of sodium carbonate and 19.1 g of sodium sulfide was all injected within 1 hour by using a syringe pump. After completion of precipitation, a slurry had a pH of 7.6, was washed with about 15 L of distilled water, filtered, and then dried at 100° C. for 12 hours or more by using a drying oven. This was subdivided and sintered at a temperature of 400° C. in an air atmosphere. After this was subdivided again, the reduction was performed at a temperature of 400° C. in a hydrogen atmosphere. After the reduction, the powder was passivated using a nitrogen mixed gas including 1% oxygen to prepare a hydrogenation catalyst.

Based on the weight of the catalyst, the nickel content of the passivated catalyst was measured as 65.7%, the weight of sulfur was measured as 3.1%, the weight of copper was measured as 0.79%, and the average size of nickel crystals was measured as 5.8 nm. The BET specific surface area was 220 m$^2$/g, the total pore volume was 0.28 m$^3$/g, and the average particle size was 5.1 nm. The hydrogen adsorption amount was 0.021 mmol H$_2$/g-catalyst. The degree of Ni reduction analyzed by H$_2$-TPR was 96.6%. Through the XPS analysis, the catalyst had an absorption pick centered around 163.1 eV. The results thereof are shown in FIG. 1.

The hydrogenation reaction for the catalyst activity test was performed at a temperature of 230° C.

Example 2

1,500 mL of a solution including 262 g of sodium carbonate and 17 g of sodium sulfide as a precipitant so that the sulfur/nickel weight ratio of the hydrogenation catalyst was 4.3% was all injected within 1 hour by using a syringe pump. After completion of precipitation, a slurry has a pH of 7.7. The other processes such as washing, filtering, and drying were the same as those in Example 1.

Based on the weight of the catalyst, the nickel content of the passivated catalyst was measured as 63.3%, the weight of sulfur was measured as 2.7%, the weight of copper was measured as 0.87%, and the average size of nickel crystals was measured as 4.8 nm. The BET specific surface area was 220 m$^2$/g, the total pore volume was 0.28 m$^3$/g, and the average particle size was 5.1 nm. The hydrogen adsorption amount was 0.039 mmol H$_2$/g-catalyst. The degree of Ni reduction analyzed by H$_2$-TPR was 92.9%. Through the XPS analysis, the catalyst had an absorption pick centered around 162.9 eV. The results thereof are shown in FIG. 1.

The hydrogenation reaction for the catalyst activity test was performed at a temperature of 230° C.

Example 3

1,500 mL of a solution including 262 g of sodium carbonate and 15 g of sodium sulfide as a precipitant so that the sulfur/nickel weight ratio of the hydrogenation catalyst was 3.8% was all injected within 1 hour by using a syringe pump. After completion of precipitation, a slurry has a pH of 7.5. The other processes such as washing, filtering, and drying were the same as those in Example 1.

Based on the weight of the catalyst, the nickel content of the passivated catalyst was measured as 60.8%, the weight of copper was measured as 0.8%, the weight of sulfur was measured as 2.3%, and the average size of nickel crystals was measured as 4.7 nm. The BET specific surface area was 230 m²/g, the total pore volume was 0.29 m³/g, and the average particle size was 4.9 nm. The hydrogen adsorption amount was 0.053 mmol H$_2$/g-catalyst. The degree of Ni reduction analyzed by H$_2$-TPR was 94.3%. Through the XPS analysis, the catalyst had an absorption pick centered around 163.2 eV. The results thereof are shown in FIG. 1.

The hydrogenation reaction for the catalyst activity test was performed at a temperature of 230° C.

Comparative Example 1

A typical hydrogenation catalyst not including sulfur was prepared. The hydrogenation catalyst of Comparative Example 1 was prepared in the same manner as in Example 1, except that sodium sulfide was not used.

Based on the weight of the catalyst, the nickel content of the passivated catalyst was measured as 62.3%, the weight of sulfur was measured as 0.3%, the weight of copper was measured as 0.76%, and the average size of nickel crystals was measured as 4.9 nm. The BET specific surface area was 220 m²/g, the total pore volume was 0.31 m³/g, and the average particle size was 5.6 nm. The degree of Ni reduction analyzed by H$_2$-TPR was 83.4%. The hydrogen adsorption amount was 0.56 mmol H$_2$/g-catalyst.

The hydrogenation reaction for the catalyst activity test was performed at a temperature of 230° C.

Table 1 below shows the constituents in the catalyst compositions of Examples 1 to 3 and Comparative Example 1.

TABLE 1

| Classification | Unit | Example 1 | Example 2 | Example 3 | Comparative Example 1 |
|---|---|---|---|---|---|
| Ni crystallite size | nm | 5.8 | 4.8 | 4.7 | 4.9 |
| Nickel (Ni) | wt. % | 65.7 | 63.3 | 60.8 | 62.3 |
| Copper (Cu) | wt. % | 0.79 | 0.87 | 0.80 | 0.76 |
| Sulfur (S) | wt. % | 3.1 | 2.7 | 2.3 | 0.3 |
| Silicon (Si) A | wt. % | 9.2 | 9.8 | 9.0 | 9.3 |
| S/Ni | (wt/wt) % | 4.7 | 4.3 | 3.8 | 0.5 |
| Cu/Ni | (wt/wt) % | 1.20 | 1.38 | 1.31 | 1.21 |
| BET specific surface area | m²/g | 220 | 220 | 230 | 220 |
| Total pore volume | cm³/g | 0.28 | 0.28 | 0.29 | 0.31 |
| Mean pore diameter | nm | 5.1 | 5.1 | 4.9 | 5.6 |
| Degree of reduction | % | 96.6 | 92.9 | 94.3 | 83.4 |
| Average particle size (d50) | μm | 5.1 | 6.1 | 4.8 | 5.7 |
| d90 | μm | 11.9 | 17.1 | 10.5 | 12.9 |
| d10 | μm | 1.6 | 1.9 | 1.6 | 2.1 |
| Hydrogen absorption amount | (mmol H$_2$/g-catalyst) | 0.021 | 0.039 | 0.053 | 0.56 |
| XPS absorption peak | eV | 163.1 | 162.9 | 163.2 | — |

Experimental Example 1

Catalyst Activity Test

A 300 mL autoclave including a hollow shaft stirrer and having a stirring speed of 1,600 rpm was used. 75 g of a solution, in which 30 wt % of a non-hydrogenated hydrocarbon resin was dissolved in Exxsol™ D40, was hydrogenated for 1 hour by adding a catalyst (Catal/DCPD resin) of 1-2% relative to the mass of the hydrocarbon resin at 230° C. and H$_2$ 90 bar. The color of the hydrocarbon resin solution after the hydrogenation was measured by ASTM D1209.

The color of the hydrocarbon resin (APHA value, standard representing the color of the solution) significantly proportional to the content of olefin in the hydrocarbon resin was 750 before hydrogenation, and the aromaticity was 18%.

The aromaticity was analyzed by $^1$H NMR.

TABLE 2

| Classification | Reaction temperature (° C.) | Catalyst (kg-cat/ kg-resin) | Aromaticity (%) | APHA |
|---|---|---|---|---|
| Example 1 | 230 | 0.02 | 13.5 | 4 |
| Example 2 | 230 | 0.02 | 10.2 | 5 |
| Example 3 | 230 | 0.02 | 8.6 | 4 |
| Comparative Example 1 | 230 | 0.01 | 0.9 | 4 |

The results of the hydrogenation reaction under the conditions described in Table 2 in accordance with Experimental Example 1 are shown in Table 2.

According to the results of the hydrogenation reaction of Comparative Example 1, the aromaticity content of the hydrogenated hydrocarbon resin is not adjusted because aromaticity as well as olefin is hydrogenated.

On the other hand, when Examples 1 to 3 were used, it was confirmed that the APHA value was the same, but olefin was preferentially hydrogenated, and thus the aromaticity content was selectively adjustable. In addition, when the color of the hydrocarbon resin is 30 or less, the hydrocarbon resin becomes a water-white resin. At this time, the content of the remaining olefin (NMR % area) is less than 0.1%. Therefore, it is confirmed that Examples 1 to 3 can provide an excellent catalysts capable of providing a water-white hydrocarbon resin through the hydrogenation reaction.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A catalyst for a hydrogenation reaction, comprising 40-80 parts by weight of nickel, 0.01-5 parts by weight of copper, 1-10 parts by weight of sulfur, and 10-60 parts by weight of a silica support based on 100 parts by weight of the entire dried catalyst including a support.

2. The catalyst of claim 1, wherein the catalyst for the hydrogenation reaction has a degree of nickel reduction of 90% or more.

3. The catalyst of claim 1, wherein an average size of crystals of the nickel is 3-10 nm.

4. The catalyst of claim 1, wherein, in the catalyst particle size distribution, an average particle size is 3-10 µm, and a proportion of particles having a size of 1 µm or less is 0-10 vol %.

5. The catalyst of claim 1, wherein the catalyst has a specific surface area of 150-300 m 2/g.

6. The catalyst of claim 1, wherein the silica support is a porous support having a specific surface area of 200-400 m 2/g and a pore size of 10-30 nm.

7. The catalyst of claim 1, wherein the nickel forms a precipitate with the copper and the sulfur, is supported on the silica support, and is deposited and precipitated.

8. The catalyst of claim 1, wherein the catalyst has a hydrogen adsorption amount per sample weight in a range of 0.01-0.3 (mmol-$H_2$/g-catalyst) through an $H_2$-chemisorption measurement.

9. The catalyst of claim 1, wherein the catalyst has an electron absorption peak by Ni—S bond in a range of 159-166 eV (binding energy or bonding energy) through an X-ray photoelectron spectroscopy (XPS) analysis.

10. The catalyst of claim 1, wherein the catalyst is at least one selected from a powder form, a particle form, and a granular form.

11. A method for preparing the catalyst for the hydrogenation reaction according to claim 1, the method comprising the steps of:
    (a) preparing a first solution by dissolving, in a solvent, 40-80 parts by weight of nickel, 0.01-5 parts by weight of copper, and 10-60 parts by weight of a silica support based on 100 parts by weight of the entire dried catalyst including a support;
    (b) adding the first solution to a precipitation container, stirring the first solution, and heating the first solution to a temperature of 60-100° C.;
    (c) after the heating, preparing a second solution by adding a pH control agent and a sulfur precursor in a precipitation container, and preparing a precipitate by adding the second solution dropwise to the first solution;
    (d) washing and filtering the precipitate and drying the precipitate to prepare a dried product and
    (e) reducing the dried product in a hydrogen atmosphere to prepare a reduced product.

12. The method of claim 11, wherein a temperature of the hydrogen atmosphere is 200-500° C.

13. The method of claim 11, further comprising, after the step (d), sintering the prepared dried product in an air atmosphere.

14. The method of claim 13, wherein a temperature of the air atmosphere is 200-500° C.

15. The method of claim 11, further comprising passivating the reduced product with a nitrogen mixed gas including 0.1-20% oxygen.

16. The method of claim 11, further comprising passivating the reduced product by depositing the reduced product in an organic solvent.

17. The method of claim 11, wherein a pH in the step (c) of preparing the precipitate is 7-9.

18. The method of claim 11, wherein the drying in the step (d) is performed at 100-200° C. for 5-24 hours.

19. A hydrogenation method for contacting a hydrocarbon resin with hydrogen in the presence of the catalyst for the hydrogenation reaction prepared by the method of claim 18.

20. The hydrogenation method of claim 19, wherein the hydrocarbon resin comprises dicyclopentadiene (DCPD).

21. The hydrogenation method of claim 19, wherein, when the hydrocarbon resin contacts the hydrogen and the hydrogenation reaction is completed, the hydrocarbon resin has an APHA value of 30 or less.

* * * * *